United States Patent [19]

Matsue et al.

[11] Patent Number: 5,856,393
[45] Date of Patent: Jan. 5, 1999

[54] PNEUMATIC TIRE FOR HEAVY LOAD

[75] Inventors: Akihiko Matsue; Tomohiro Kusano, both of Tokyo, Japan

[73] Assignee: Bridgestone Corporation, Tokyo, Japan

[21] Appl. No.: 791,946

[22] Filed: Jan. 31, 1997

[30] Foreign Application Priority Data

Jan. 31, 1996 [JP] Japan .................................. 8-035684
Jan. 31, 1996 [JP] Japan .................................. 8-035685

[51] Int. Cl.$^6$ ........................................................ C08K 3/00
[52] U.S. Cl. .......................... 524/493; 524/492; 524/495; 524/496
[58] Field of Search ...................... 524/492, 493, 524/495, 496

[56] References Cited

U.S. PATENT DOCUMENTS 5,534,578   7/1996   Wideman et al. ....................... 524/396

OTHER PUBLICATIONS

Kirk–Othmer, Encyclopedia of Chemical Technology, 4th ed. (1992).
Cabot, Carbon Blacks, Mar. 1989.

*Primary Examiner*—Edward J. Cain
*Attorney, Agent, or Firm*—Sughrue, Mion, Zinn, Macpeak & Seas, PLLC

[57] ABSTRACT

A pneumatic tire for heavy loads having a rubber composition for a tread rubber for a construction vehicle or the like, containing carbon black having a nitrogen adsorption specific surface area of 100 to 160 $m^2/g$, and an oil (dibutyl phthalate) absorption amount (DBP) of 80 to 130 ml/100 g, and silica having a nitrogen adsorption specific surface area of 210 to 260 $m^2/g$, and an oil absorption amount of 200 to 260 ml/100 g, by a total content of 40 to 70 parts by weight, in 100 parts by weight of isoprene rubber material, wherein the rubber composition contains 3 to 15 parts by weight of the total content. Further, the rubber composition contains 30 to 50 parts by weight of carbon black having a nitrogen adsorption specific surface area of 130 to 180 $m^2/g$, and an oil (dibutyl phthalate) absorption amount (DBP) of 80 to 120 ml/100 g, and 5 to 15 parts by weight of silica having a nitrogen adsorption specific surface area of 170 $m^2/g$ or more, and 2.0 parts by weight or more of aging preventive agent, in 100 parts by weight of isoprene rubber material, wherein the compounding ratio of silica to carbon black (silica/carbon black) in the rubber composition is in a range of from 0.1 to 0.5 in the rubber composition.

16 Claims, No Drawings

PNEUMATIC TIRE FOR HEAVY LOAD

BACKGROUND OF THE INVENTION

1. Field of the Invention

The present invention relates to a pneumatic tire for heavy loads for a construction vehicle or the like having both a low heat generation characteristic and a high wear resistance without sacrificing the working efficiency in manufacturing process of the tires. The invention further relates to a tire for construction vehicle for heavy loads, in particular, a pneumatic tire for heavy loads running on an unpaved road, excellent in heat generation characteristic, change of tire appearance, and wear resistance after traveling, and suppressed in a reduction of physical properties.

2. Description of the Related Art

Hitherto, in a pneumatic tire for heavy loads for rough roads, as a means for preventing heat generation, change of external appearance of the tire and reduction of wear resistance, and various physical properties, the carbon black to be blended in the tire tread rubber has been selected and the filling amount thereof optimized. Recently, various types of tread rubbers for pneumatic tires for heavy load containing silica, together with carbon black blended in the tread rubber composition have been proposed.

For example, JP-A No. 1-311141, JP-A No. 3-65406, and JP-A No. 4-226140 propose attempts to improve the wear resistance, cut resistance, heat generation characteristic and others by blending silica together with carbon black in the rubber composition for the tread of a pneumatic tire for heavy load for construction vehicles or the like.

Similarly, JP-A No. 3-84049 and JP-A No. 5-98074 propose attempts to improve the wear resistance, break resistance, low heat generation, tire appearance after traveling on a rough road and others by blending silica together with carbon black having a specific characteristic in the rubber composition for the tread of a pneumatic tire for heavy load.

Further, JP-A No. 61-287945 and JP-A No. 1-118551 disclose that heat generation and cut resistance can be improved by blending carbon black and silica in a rubber composition. Furthermore, JP-A No. 46-1688 discloses blending of carbon black and silica for preventing deterioration of mechanical properties of rubber products used in severe conditions such as tires.

However, in the pneumatic tire for heavy loads running on a rough road, a large distortion amplitude is applied repeatedly to the rubber composition disposed in the tread during travel, and the tire temperature is significantly raised, resulting in an extreme reduction of the life of the tire. On the other hand, conventionally, in order to improve the wear resistance of a pneumatic tire for heavy loads, it was attempted to change the types and amounts of fillers, but this resulted in a deterioration of the heat generation characteristic and working efficiency in tire manufacturing process, so that satisfactory results could not be obtained.

Further, these prior art references in which silica was compounded with carbon black in the rubber composition for the tread of the pneumatic tire for heavy loads, were not intended to improve both the heat generation characteristic after traveling, external appearance and wear resistance and to suppress reduction of physical properties of the tire, especially reduction of the breaking elongation (Eb) at a high temperature. That is, in the prior art, nothing was considered about suppressing of reduction of physical properties after drastic changes of the tread caused by running on a rough road, in addition to improvement of appearance characteristic, wear resistance and heat generation characteristic.

SUMMARY OF THE INVENTION

It is a first object of the present invention to improve both heat generation characteristic and wear resistance without deteriorating the working efficiency in tire manufacturing process, in a pneumatic tire for heavy loads for a construction vehicle or the like.

It is a second object of the present invention to improve appearance characteristic after running and wear resistance, and to suppress heat generation and deterioration of physical properties, especially reduction of the breaking elongation (Eb) at a high temperature, in a tire of a construction vehicle for heavy loads, especially in a pneumatic tire for heavy loads running on an unpaved road.

A first aspect of the present invention is to blend carbon black having a specific characteristic with specific silica at a specified ratio in a pneumatic tire for heavy loads, that is, the pneumatic tire for heavy load of the present invention having a rubber composition for a tread rubber comprises carbon black having a nitrogen adsorption specific surface area, which is determined by measuring an amount of adsorption of nitrogen, of 100 to 160 $m^2/g$, and an oil (dibutyl phthalate) absorption amount (DBP) of 80 to 130 ml/100 g, and silica having a nitrogen adsorption specific surface area of 210 to 260 $m^2/g$, and an oil absorption amount of 200 to 260 ml/100 g, by a total content of 40 to 70 parts by weight, in 100 parts by weight of isoprene rubber material, wherein the rubber composition contains the silica of 3 to 15 parts by weight of the total content, thereby achieving the first object of the present invention.

Further, concerning the second object of the present invention, when the rubber composition in which an aging preventive agent is blended in an amount more than that of conventional manner, in addition to carbon black and silica which were compounded in a predetermined amount in the rubber composition was applied to a tire tread, the wear resistance and external appearance were improved, and it was also found that a heat generation after running on a rough road and the reduction of a breaking elongation (Eb) could be suppressed.

That is, a second aspect of the invention is to provide a pneumatic tire for heavy loads having a rubber composition for a tread rubber, comprising 30 to 50 parts by weight of carbon black having a nitrogen adsorption specific surface area of 130 to 180 $m^2/g$, and an oil (dibutyl phthalate) absorption amount (DBP) of 80 to 120 ml/100 g, and 5 to 15 parts by weight of silica having a nitrogen adsorption specific surface area of 170 $m^2/g$ or more, and 2.0 parts by weight or more of an aging preventive agent, in 100 parts by weight of isoprene rubber material, in which the rubber composition contains the silica and carbon black at a compounding ratio (silica/carbon black) in a range of from 0.1 to 0.5, thereby achieving the second object of the invention.

DESCRIPTION OF THE PREFERRED EMBODIMENTS

As the isoprene rubber used in the invention, isoprene synthetic rubber may be used aside from natural rubber.

In the first aspect of the present invention, the carbon black should have a nitrogen adsorption specific surface area of 100 to 160 $m^2/g$, and an oil (dibutyl phthalate) absorption amount (DBP) of 80 to 130 ml/100 g, preferably a nitrogen adsorption specific surface area of 110 to 150 m²/g and DBP of 85 to 120 ml/100 g. If the nitrogen adsorption specific surface area of carbon black is less than 100 m²/g, or DBP is less than 80 ml/100 g, sufficient wear resistance cannot be obtained, or if a nitrogen adsorption specific surface area exceeds 160 m²/g or DBP exceeds 130 ml/100 g, the heat generation characteristic is deteriorated.

As silica, the nitrogen adsorption specific surface area should be 210 to 260 m²/g and the oil absorption amount should be 200 to 260 ml/100 g, preferably the nitrogen adsorption specific surface area of 210 to 240 m²/g and the oil absorption amount of 220 to 240 ml/100 g. The silica has preferably the characteristic as mentioned above for achieving both desired heat generation characteristic and wear resistance, and the reason is that an optimum dispersion state in the above ranges of silica can be obtained. When the nitrogen adsorption specific surface area exceeds 260 m²/g, the viscosity of the rubber composition increases, and the working efficiency in tire manufacture is reduced. If the nitrogen adsorption specific surface are is less than 210 m²/g, the wear resistance cannot sufficiently be improved. On the other hand, if the amount of oil absorption exceeds 260 ml/100 g, the heat generation characteristic is not sufficiently improved, or if the amount of oil absorption is less than 200 ml/100 g, it is hard to maintain a favorable balance between the heat generation characteristic and wear resistance.

In the first aspect of the present invention, the carbon black and silica should be contained in a total amount of 40 to 70 parts by weight in 100 parts by weight of isoprene rubber material. If the total amount of the silica and carbon black is less than 40 parts by weight, the wear resistance is insufficient, and if exceeding 70 parts by weight, the heat generation characteristic is worsened. Of the total amount, the silica content should be 3 to 15 parts by weight, preferably 5 to 10 parts by weight. When the content of the silica is outside of the above-specified range, it is difficult to maintain a favorable balance between the heat generation characteristic and wear resistance.

The values of the nitrogen adsorption specific surface are and DBP of carbon black were measured in accordance with ASTM D4820-93 and ASTM D2414-93, respectively. The nitrogen adsorption specific surface area and the oil absorption amount of silica are determined after drying silica at 300° C. for one hour by the similar manner to those of the carbon black in accordance with ASTM D4820-93 and ASTM D2414-93, respectively.

In the tread rubber of a pneumatic tire for heavy loads in accordance with the first aspect of the invention, aside from the above-specified carbon black and silica, usual additives such as a vulcanizer, vulcanization accelerator, vulcanization aid and others may be added by usual amounts.

In the pneumatic tire in accordance with the second aspect of the invention, the carbon black should have a nitrogen adsorption specific surface area of 130 to 180 m²/g, and an oil (dibutyl phthalate) absorption amount (DBP) of 80 to 120 ml/100 g, preferably of 140 to 170 m²/g and DBP of 90 to 110 ml/100 g. If the nitrogen adsorption specific surface area of the carbon black is less than 130 m²/g, sufficient wear resistance is not obtained, or if more than 180 m²/g, the productivity of the tire is notably lowered. If the DBP is less than 80 ml/100 g, the productivity is notably lowered, or if more than 120 ml/100 g, gel increases, and the breaking elongation (Eb) is markedly reduced.

When the content of the carbon black is less than 30 parts by weight in 100 parts by weight of rubber material, sufficient wear resistance cannot be obtained, or if exceeding 50 parts by weight, dispersion of the carbon black becomes insufficient. As a result the heat generation characteristic and wear resistance are deteriorated.

The nitrogen adsorption specific surface area of the silica should be 170 m²/g or more. If the nitrogen adsorption specific surface area is less than 170 m²/g, the wear resistance is deteriorated and it is not preferable. If the content of the silica is less than 5 parts by weight in 100 parts by weight of the rubber material, suppression of the reduction of the breaking elongation (Eb) and other effects cannot be obtained, and if the content of the silica exceeds 15 parts by weight, dispersion of the silica becomes insufficient, and the heat generation characteristic is deteriorated.

In the second aspect of the present invention, moreover, the compounding ratio of the silica to the carbon black (silica/carbon black) in the rubber composition is in a range of from 0.1 to 0.5, preferably 0.15 to 0.3. If this ratio is less than 0.1, suppression of reduction of the breaking elongation (Eb) and other effects cannot be obtained, and if the ratio exceeds 0.5, dispersion becomes insufficient, and the heat generation characteristic and wear resistance are significantly deteriorated.

The nitrogen adsorption specific surface area and DBP of carbon black in the second aspect of the present invention were determined by the similar manner to those of the first aspect of the present invention, in accordance with ASTM D4820-93 and ASTM D2414-93, respectively.

In the second aspect of the invention, an aging preventive agent, preferably an amine aging preventive agent should be contained by 2.0 parts by weight or more, preferably 2.5 parts by weight or more, more preferably 3.0 parts by weight or more in 100 parts by weight of the rubber material. When the content of the aging preventive agent is less than 2.0 parts by weight, suppression of reduction of the breaking elongation (Eb) and other effects cannot be obtained.

In the tread rubber of a pneumatic tire for heavy load of the second aspect of the present invention, aside from the above-described carbon black, silica and aging preventive agent, usual additives such as a vulcanizer, vulcanization accelerator, vulcanization aid and other compounds may be blended by usual amounts.

The tread using the above rubber composition may be formed in one layer, or in two layers of a so-called cap/base structure, and the rubber composition of the present invention may be applied in the cap only, and another rubber may be used in the base.

EXAMPLE 1

An example according to the first aspect of the invention is described below.

According to the compounding ratios as shown in Table 1 below, various rubber compositions were prepared, and trial tires (off-the-road tires: 3700R57) were fabricated by using these rubber compositions as the tread rubber according to the conventional vulcanization condition.

The manufactured trial tires were evaluated in accordance with the following performance tests.

(a) Heat generation characteristic

A drum test was conducted at a constant speed in step load conditions, and the temperature was measured at a specific position inside of the tread. The results are indicated as indices when the value of Comparative Example 1 is expressed by 100. The greater index value, the less increase of temperature due to heat generation, and the sample has a lower heat generation property.

(b) Wear resistance

After running for 2000 hours, the tread groove depth was measured at several positions, and averaged, and it was evaluated by the formula [(remaining groove depth of trial tire)/(remaining groove depth of control tire (Comparative Example 1))]×100. The greater value, the higher wear resistance.

(c) Working efficiency

Mooney viscosity was measured at 130±1° C. by using an L-shaped rotor, and the results are shown by indices when the value of Comparative Example 1 is expressed by 100. The greater value, the better working efficiency.

The results obtained are shown in Table 1.

(a) Heat generation characteristic

By running continuously for a predetermined period of time, the temperature was measured at a predetermined position inside of the tread, and the results obtained were indicated in terms of index when the value of Comparative Example 1 is expressed as 100. The greater value, the lower heat generation property.

(b) Breaking elongation (Eb)

According to JIS K 6251, dumbbell-shaped samples having the size of No. 2 were cut out in a thickness of 2 mm from the tread of the tire, and the breaking elongation were measured. The results of evaluation are expressed in terms of index when the value before running of Comparative

TABLE 1

|  |  | Comp. Ex. 1 | Comp. Ex. 2 | Ex. 1 | Ex. 2 | Comp. Ex. 3 | Comp. Ex. 4 | Comp. Ex. 5 | Ex. 3 | Ex. 4 |
| --- | --- | --- | --- | --- | --- | --- | --- | --- | --- | --- |
| Compounding ratio (parts by weight) | Natural rubber | 100 | 100 | 100 | 100 | 100 | 100 | 100 | 100 | 100 |
|  | Carbon black | 45 | 40 | 40 | 45 | 45 | 45 | 45 | 42 | 40 |
|  | Silica | 10 | 10 | 10 | 10 | 10 | 10 | 10 | 8 | 15 |
|  | Aging preventive agent (6C) [1] | 1 | 1 | 1 | 1 | 1 | 1 | 1 | 1 | 1 |
|  | Stearic acid | 2 | 2 | 2 | 2 | 2 | 2 | 2 | 2 | 2 |
|  | Paraffin wax | 2 | 2 | 2 | 2 | 2 | 2 | 2 | 2 | 2 |
|  | Zinc white | 3 | 3 | 3 | 3 | 3 | 3 | 3 | 3 | 3 |
|  | CZ [2] | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 |
| Carbon black | Nitrogen adsorption specific surface area ($m^2/g$) | 145 | 145 | 145 | 145 | 145 | 145 | 145 | 145 | 145 |
|  | DBP (ml/100 g) | 90 | 90 | 90 | 90 | 90 | 90 | 90 | 90 | 90 |
| Silica | BET adsorption amount ($m^2/g$) | 170 | 170 | 230 | 230 | 220 | 195 | 270 | 230 | 230 |
|  | Oil absorption amount (ml/100 g) | 160 | 160 | 230 | 230 | 190 | 270 | 170 | 230 | 230 |
| Working efficiency |  | 100 | 92 | 95 | 102 | 102 | 102 | 109 | 100 | 105 |
| Tire temperature |  | 100 | 107 | 104 | 101 | 95 | 95 | 94 | 103 | 97 |
| Wear resistance |  | 100 | 93 | 118 | 115 | 110 | 102 | 110 | 113 | 130 |

[1] N-(1,3-dimethyl butyl)-N'-phenyl-p-phenylene diamine
[2] Vulcanization accelerator: N-cyclohexyl-2-benzothiazyl-sulfenamide As described above, in the pneumatic tire for heavy load according to the first aspect of the invention, the wear resistance can be enhanced substantially without deteriorating the working efficiency in tire manufacture and the heat generation characteristic, so that both heat generation characteristic and wear resistance can sufficiently be improved.

EXAMPLE 2

An example according to the second aspect of the present invention is described below.

According to the compounding ratios as shown in Table 2 below, various rubber compositions were prepared, and trial tires (off-the-road tires: 3700R57) were fabricated by using these rubber compositions as the tread rubber under the conventional vulcanization condition.

The manufactured trial tires were mounted on actual vehicles and tested by driving on a representative mine, and were evaluated by the following performance tests.

Example 1 is 100. The greater value, the better breaking elongation (Eb).

(c) Change of external appearance

After running for a predetermined period of time, the total area of flaws formed on the tread was measured. The results were indicated in terms of index when the value of Comparative Example is expressed as 100. The greater value, the better appearance performance.

(d) Wear resistance

After running for 2000 hours, the tread groove depth was measured at several positions, and averaged, and it was evaluated by the formula [(remaining groove depth of trial tire)/(remaining groove depth of control tire (Comparative Example 1))]×100. The greater value, the higher wear resistance.

The results obtained are shown in Table 2.

TABLE 2

|  |  | Comp. Ex. 1 | Comp. Ex. 2 | Ex. 1 | Ex. 2 | Ex. 3 | Comp. Ex. 3 | Ex. 4 | Ex. 5 | Ex. 6 | Comp. Ex. 4 | Comp. Ex. 5 |
|---|---|---|---|---|---|---|---|---|---|---|---|---|
| Compounding ratio (parts by weight) | NR [1] | 100 | 50 | 100 | 100 | 100 | 100 | 100 | 100 | 100 | 100 | 100 |
|  | SBR [2] | 0 | 50 | 0 | 0 | 0 | 0 | 0 | 0 | 0 | 0 | 0 |
|  | Carbon black | 45 | 50 | 40 | 35 | 30 | 37 | 40 | 40 | 45 | 30 | 57 |
|  | Silica [3] | 0 | 0 | 5 | 8 | 14 | 9 | 5 | 5 | 15 | 20 | 10 |
|  | Aging preventive agent [4-1] | 1 | 3 | 3 | 2 | 3.5 | 15 | 3 [3] | 3 | 45 | 3 | 1.5 |
|  | Stearic acid | 2 | 2 | 2 | 2 | 2 | 2 | 2 | 2 | 2 | 2 | 2 |
|  | Zinc white | 3 | 3 | 3 | 3 | 3 | 3 | 3 | 3 | 3 | 3 | 3 |
|  | CZ [5] | 1.0 | 1.0 | 10 | 1.0 | 1.0 | 1.0 | 1.0 | 1.0 | 1.0 | 1.0 | 1.0 |
|  | Sulfur | 1.5 | 1.5 | 1.5 | 1.5 | 1.5 | 1.5 | 1.5 | 1.5 | 1.5 | 1.5 | 1.5 |
| Carbon black | Nitrogen adsorption specific surface area ($m^2/g$) | 140 | 140 | 165 | 135 | 140 | 172 | 165 | 160 | 140 | 140 | 172 |
|  | DBP (ml/100 g) | 100 | 100 | 100 | 110 | 91 | 96 | 100 | 87 | 100 | 100 | 96 |
| Silica/carbon black ratio |  | 0 | 0 | 0.125 | 0.229 | 0.467 | 0.243 | 0.125 | 0.125 | 0.306 | 0.667 | 0.175 |
| Heat generation characteristic (index) |  | 100 | 85 | 99 | 109 | 103 | 96 | 100 | 98 | 92 | 87 | 75 |
| Eb | Before running (index) | 100 | 92 | 115 | 100 | 121 | 118 | 117 | 119 | 119 | 120 | 110 |
|  | After running (index) | 82 | 91 | 104 | 93 | 112 | 106 | 108 | 112 | 114 | 114 | 98 |
| Appearance (index) |  | 100 | 112 | 115 | 114 | 120 | 117 | 117 | 122 | 125 | 120 | 109 |
| Wear resistance (index) |  | 100 | 105 | 115 | 108 | 112 | 122 | 115 | 113 | 120 | 95 | 91 |
| Ratio of Eb before and after running |  | 0.82 | 0.98 | 0.90 | 0.93 | 0.93 | 0.9 | 0.92 | 0.94 | 0.96 | 0.95 | 0.89 |

[1] Natural rubber
[2] Styrene butadiene rubber
[3] BET adsorption amount: 170 to 220 $m^2/g$ (Nippon Silica AQ)
[4-1] Santoflex 13: N-(1,3-dimethyl butyl)-N'-phenyl-p-phenylene diamine
[4-2] Santoflex 17: N,N'-bis(1-ethyl-3-methyl pentyl)-p-phenylene diamine
[5] N-cyclohexyl-2-benzothiazyl-sulfenamide As described herein, in the pneumatic tire for heavy loads according to the second aspect of the invention, the change of the external appearance and wear resistance of the tire can be improved substantially, and moreover the heat generation after running can be prevented and the reduction of the breaking elongation (Eb) at a high temperature can be notably suppressed.

What is claimed is:

1. A pneumatic tire for heavy loads having a rubber composition for tread rubber, comprising 30 to 50 parts by weight of carbon black having a nitrogen adsorption specific surface area of 130 to 180 $m^2/g$, and an oil (dibutyl phthalate) absorption amount (DBP) of 80 to 120 ml/100 g, and 5 to 15 parts by weight of silica having a nitrogen adsorption, specific surface area of 170 $m^2/g$ or more, and 2.5 parts by weight or more of an aging preventive agent, in 100 parts by weight of isoprene rubber material, wherein the compounding ratio of silica to carbon black (silica/carbon black) in the rubber composition is in a range of from 0.1 to 0.5, and the rubber composition is free of a silane coupling agent.

2. A pneumatic tire for heavy loads of claim 1, wherein the carbon black has the nitrogen adsorption specific surface area of 140 to 170 $m^2/g$, and the oil (dibutyl phthalate) absorption amount (DBP) of 90 to 100 ml/100 g.

3. A pneumatic tire for heavy loads of claim 1, wherein the compounding ratio of silica to carbon black (silica/carbon black) is in a range of from 0.15 to 0.3.

4. A pneumatic tire for heavy loads of claim 2, wherein the compounding ratio of silica to carbon black (silica/carbon black) is in a range of from 0.15 to 0.3.

5. A pneumatic tire for heavy loads of claim 1, wherein the aging preventive agent is an amine aging preventive agent, and the amine aging preventive agent is contained by 2.5 parts by weight or more in 100 parts by weight of the rubber material.

6. A pneumatic tire for heavy loads of claim 2, wherein the aging preventive agent is an amine aging preventive agent, and the amine aging preventive agent is contained by 2.5 parts by weight or more in 100 parts by weight of the rubber material.

7. A pneumatic tire for heavy loads of claim 3, wherein the aging preventive agent is an amine aging preventive agent, and the amine aging preventive agent is contained by 2.5 parts by weight or more in 100 parts by weight of the rubber material.

8. A pneumatic tire for heavy loads of claim 4, wherein the aging preventive agent is an amine aging preventive agent, and the amine aging preventive agent is contained by 2.5 parts by weight or more in 100 parts by weight of the rubber material.

9. A pneumatic tire for heavy loads of claim 5, wherein the aging preventive agent is an amine aging preventive agent, and the amine aging preventive agent is contained by 3.0 parts by weight or more in 100 parts by weight of the rubber material.

10. A pneumatic tire for heavy loads of claim 6, wherein the aging preventive agent is an amine aging preventive agent, and the amine aging preventive agent is contained by 3.0 parts by weight or more in 100 parts by weight of the rubber material.

11. A pneumatic tire for heavy loads of claim 7, wherein the aging preventive agent is an amine aging preventive agent, and the amine aging preventive agent is contained by 3.0 parts by weight or more in 100 parts by weight of the rubber material.

12. A pneumatic tire for heavy loads of claim 8, wherein the aging preventive agent is an amine aging preventive agent, and the amine aging preventive agent is contained by 3.0 parts by weight or more in 100 parts by weight of the rubber material.

13. A pneumatic tire for heavy loads of claim 9, wherein the amine aging preventive agent is at least one aging preventive agent selected from the group consisting of N-(1,3-dimethyl butyl)-N'-phenyl-p-phenylene diamine and N,N'-bis(1-ethyl-3-methyl pentyl)-p-phenylene diamine.

14. A pneumatic tire for heavy loads of claim 10, wherein the amine aging preventive agent is at least one aging preventive agent selected from the group consisting of N-(1,3-dimethyl butyl)-N'-phenyl-p-phenylene diamine and N,N'-bis(1-ethyl-3-methyl pentyl)-p-phenylene diamine.

15. A pneumatic tire for heavy loads of claim 11, wherein the amine aging preventive agent is at least one aging preventive agent selected from the group consisting of N-(1,3-dimethyl butyl)-N'-phenyl-p-phenylene diamine and N,N'-bis(1-ethyl-3-methyl pentyl)-p-phenylene diamine.

16. A pneumatic tire for heavy loads of claim 12, wherein the amine aging preventive agent is at least one aging preventive agent selected from the group consisting of N-(1,3-dimethyl butyl)-N'-phenyl-p-phenylene diamine and N,N'-bis(1-ethyl-3-methyl pentyl)-p-phenylene diamine.

* * * * *